United States Patent
Boyer

(10) Patent No.: US 10,047,685 B2
(45) Date of Patent: Aug. 14, 2018

(54) OUTPUT CIRCUIT FOR AN ENGINE CONTROL DEVICE, AND MONITORING METHOD FOR SUCH A CIRCUIT

(71) Applicants: CONTINENTAL AUTOMOTIVE FRANCE, Toulouse (FR); CONTINENTAL AUTOMOTIVE GMBH, Hannover (DE)

(72) Inventor: Jean-Luc Boyer, Tournefeuille (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 917 days.

(21) Appl. No.: 14/378,477

(22) PCT Filed: Feb. 20, 2013

(86) PCT No.: PCT/EP2013/000492
§ 371 (c)(1),
(2) Date: Aug. 13, 2014

(87) PCT Pub. No.: WO2013/124061
PCT Pub. Date: Aug. 29, 2013

(65) Prior Publication Data
US 2015/0039204 A1   Feb. 5, 2015

(30) Foreign Application Priority Data
Feb. 22, 2012   (FR) ...................................... 12 00512

(51) Int. Cl.
*G01R 31/02* (2006.01)
*F02D 29/02* (2006.01)
(Continued)

(52) U.S. Cl.
CPC ............. *F02D 29/02* (2013.01); *F02D 41/22* (2013.01); *F02D 41/28* (2013.01);
(Continued)

(58) Field of Classification Search
CPC ...... B60W 10/06; B60W 10/08; B60W 20/00; Y02T 10/6286; Y02T 10/7077
See application file for complete search history.

(56) References Cited

U.S. PATENT DOCUMENTS 5,214,577 A     5/1993   Sztipanovits et al.
6,125,322 A *   9/2000   Bischof ................. F02D 41/266
                                                    123/350
(Continued)

FOREIGN PATENT DOCUMENTS

| CN | 101655026 | 2/2010 |
| FR | 2 901 616 A1 | 11/2007 |
| FR | 2 826 744 A1 | 10/2011 |
| WO | 2011120801 A1 | 10/2011 |

OTHER PUBLICATIONS

International Search Report, dated Jun. 19, 2013, from corresponding PCT application.

*Primary Examiner* — Shawki S Ismail
*Assistant Examiner* — Zoheb Imtiaz
(74) *Attorney, Agent, or Firm* — Young & Thompson

(57) ABSTRACT

An engine control device (2) of a motor vehicle includes: a control device (6) with elements for generating a control signal; and at least one output circuit (8) including: an input (14) intended to receive a control signal generated by the control device (6), and an output (16) connected to a component (4) and equipped with switching elements (18). The control device (2) further includes a monitoring device (20), which has: a first input (24) receiving the signal from the input (14) of the output circuit (8) connected to the control device (6), a second input (22) connected to the
(Continued)

Figure 1:
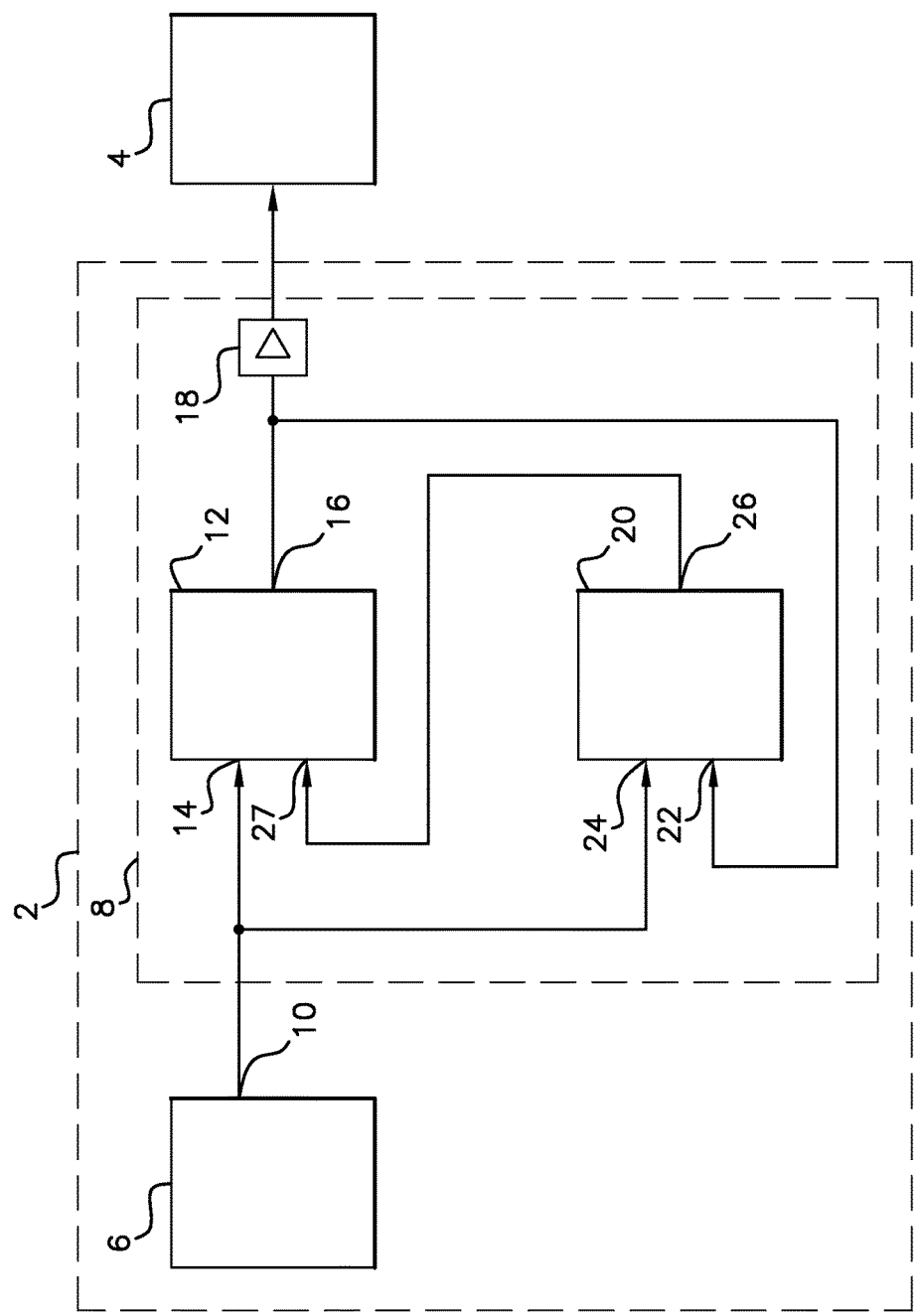

output (16) of the output circuit (8), and control elements associated with time delay elements for interrupting the connection between the output of the output circuit (8) and the component (4).

12 Claims, 3 Drawing Sheets

(51) Int. Cl.
  *F02D 41/22* (2006.01)
  *F02D 41/28* (2006.01)
  *G05B 19/042* (2006.01)

(52) U.S. Cl.
  CPC ...... *G05B 19/0425* (2013.01); *F02D 2700/07* (2013.01); *G05B 2219/21163* (2013.01); *Y02T 10/40* (2013.01)

(56) References Cited

U.S. PATENT DOCUMENTS

| | | | |
|---|---|---|---|
| 2003/0023407 A1 | 1/2003 | Loehr et al. | |
| 2004/0160725 A1* | 8/2004 | Gu | F02D 41/20 361/152 |
| 2010/0043400 A1 | 2/2010 | Wang et al. | |
| 2011/0133715 A1* | 6/2011 | Zushi | G01R 31/024 323/285 |
| 2013/0079897 A1 | 3/2013 | Boehl et al. | |

* cited by examiner

OUTPUT CIRCUIT FOR AN ENGINE CONTROL DEVICE, AND MONITORING METHOD FOR SUCH A CIRCUIT

BACKGROUND OF THE INVENTION

The present invention relates to an output circuit for an engine control device and a method of monitoring such a circuit.

The present invention relates more particularly to motor vehicles (cars, trucks, motorcycles, etc.) equipped with an internal combustion or electric engine.

A modern engine for a motor vehicle is usually managed, at least partially, by an engine control device, or digital engine control device also known under the abbreviation ECU (for 'Engine Control Unit'). This control device chiefly comprises an electronic computer, or microcontroller, which ensures the digital processing of signals that it receives from various sensors and which controls components such as, for example, the corresponding actuators. The control device generally comprises one (or more) intelligent output circuit(s) which drive outputs connected to said components. The output signals are controlled by each output circuit according to control signals received from the computer.

For each component, making a diagnosis of the connection to the component is known for checking the correct operation of the output circuits. The diagnostic function is generally performed regularly, at as high a frequency as possible. Each time that this diagnosis is implemented, the result, positive or negative, is transmitted to a management device which centralizes all the results of all the diagnoses carried out. The diagnosis is performed by the microcontroller which regularly sends diagnostic requests to the corresponding output circuit. The latter then responds to the microcontroller. The response thus provided is used to determine whether or not the output circuit concerned is operating correctly.

DESCRIPTION OF THE RELATED ART

Document FR 2 901 616 describes a system for performing diagnoses within an engine control device. The system described in this document must be combined with an On-Board Diagnostic system (more commonly known under the abbreviation OBD) which is an on-board system in the motor vehicle having the function of measuring and interpreting any information on the state of the vehicle or of one of the elements thereof for the purpose of establishing a diagnosis.

It should also ensure that the diagnoses are made at a sufficiently high frequency. A check is then performed for determining the ratio between the number of tests of correct operation which have been carried out and the number of tests that, theoretically, could have been carried out.

SUMMARY OF THE INVENTION

The present invention is intended to provide means for simplifying diagnostic management while ensuring, of course, the reliability of the tests performed.

For this purpose, it proposes an engine control device for a motor vehicle comprising:
- a control device with means for generating a control signal, and
- at least one output circuit comprising:
  - an input intended to receive a control signal generated by the control device, and
  - an output connected to a component and equipped with switching means.

According to the present invention, said output circuit further comprises a device, called a monitoring device, which has:
- a first input receiving the signal from the input of the output circuit connected to the control device,
- a second input connected to the output of the output circuit,
- control means associated with time delay means for interrupting the connection between the output of the output circuit and the component.

This novel configuration can be used to monitor an output circuit, more generally known as a 'driver', so as to ensure the regular performance of tests. Indeed, the monitoring device receives the test signals. It is associated with the time delay means. If it does not receive the test signals in sufficient number, it can intervene to interrupt the connection between the output of the output circuit and the component so that, in order for the latter to be operational, it becomes mandatory to perform tests at a sufficiently high frequency for making a diagnosis of the system incorporating the component associated with said output circuit.

In a control device according to the present invention, the monitoring device may be physically integrated into the output circuit. In a variant embodiment, the monitoring device may be a separate circuit from the output circuit.

A monitoring device of an output circuit of a control device according to the present invention advantageously comprises analysis means in order to determine whether the signal received at the first input thereof and/or the second input thereof corresponds to a predetermined type of signal.

The present invention also relates to a method of monitoring an output circuit, said output circuit comprising:
- an input intended to receive signals, each signal capable of being a control signal generated by a control device or a test signal, and
- an output connected to a component and equipped with switching means.

According to the present invention, said method comprises the following steps:
a) monitoring an output signal emitted at the output of the output circuit as well as a test signal received at the input of said output circuit,
b) initiation of a time delay on detection of the output signal, said time delay defining a time interval of predetermined length,
c) if during said time interval no test signal is received, action on the switching means for opening the connection between the output circuit and the corresponding component, and return to step a),
d) If during said time interval a test signal is received, return to step b).

In such a method of monitoring, it is advantageously provided that each signal received at the input of the monitoring device is analyzed, and that if the received signal does not correspond to a predetermined type of signal, it is regarded as not being received.

BRIEF DESCRIPTION OF THE DRAWING FIGURES

Figure 2:
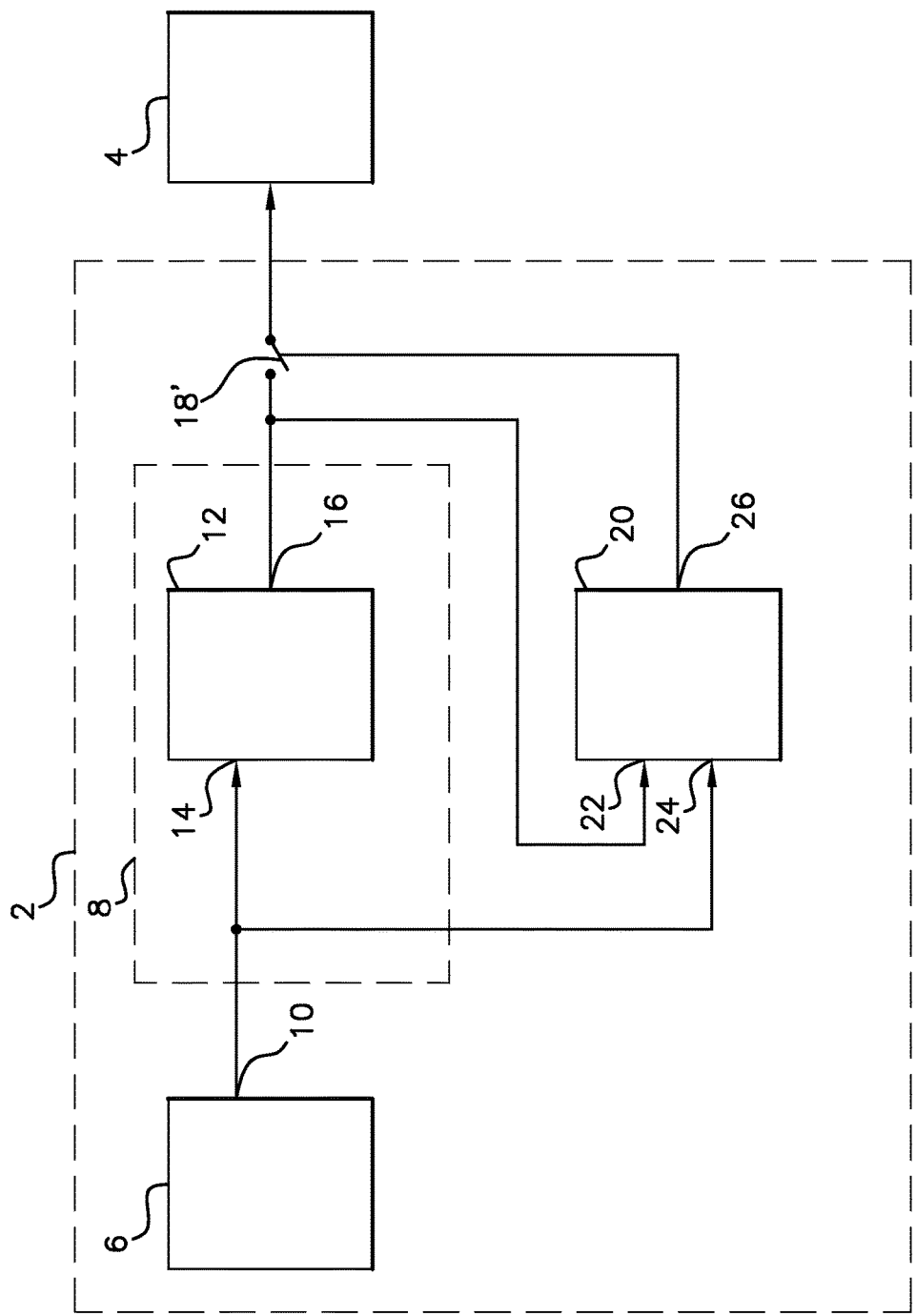
Figure 3:
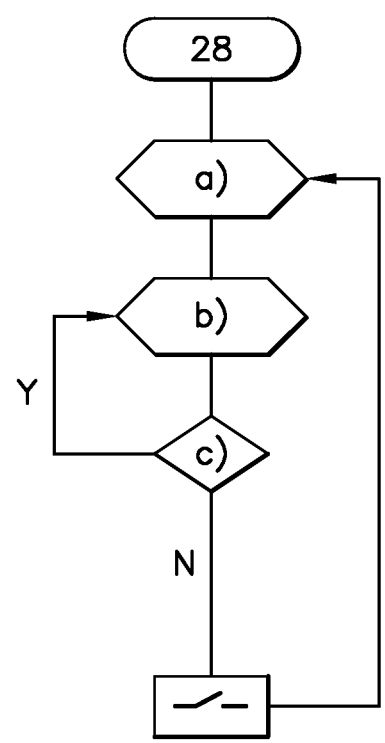

Details and advantages will better emerge from the following description of at least one embodiment of the invention, with reference to the accompanying schematic drawings in which:

FIG. 1 schematically illustrates an engine control device according to the present invention, FIG. 2 corresponds to FIG. 1 for a variant embodiment of the invention, and FIG. 3 is a flow diagram illustrating a method according to the present invention.

DETAILED DESCRIPTION OF THE INVENTIOR

FIG. 1 schematically illustrates a digital engine control device for a motor vehicle. Here it may refer to an internal combustion engine or an electric engine. The present invention may also be applied to any type of vehicle such as, for example, a motorcycle, a truck, a bus, etc. Such a digital control device is also known under the abbreviation ECU (for 'Engine Control Unit'). Such a control device generally takes the form of an electronic computer which receives signals from various sensors in the corresponding vehicle and, according to these, controls various actions. FIG. 1 is a simplified view in that it only relates to a single action managed by the digital control device. Thus FIG. 1 shows an actuator 4 corresponding to the single action represented in this figure. Of course, as the person skilled in the art knows, a modern vehicle comprises multiple actuators controlled by one and the same digital control device.

Inside the digital control device 2, FIG. 1 illustrates a microcontroller 6 and an output circuit 8.

The microcontroller 6 forms the heart of the digital control device 2. It includes in particular a chip and other electronic elements enabling it to operate as an autonomous unit. This microcontroller 6 may be a prior art microcontroller. It comprises, for example, an input/output bus. FIG. 1 illustrates a single output of the microcontroller 6, said output hereafter being referred to as first output 10. This first output 10 is intended to send a control signal to the actuator 4. In a conventional way in electronics, the output circuit 8 is located between the actuator 4 and the microcontroller 6 for shaping the control signal from the microcontroller 6 so that it can be interpreted by the actuator 4. Such an output circuit is better known as a 'driver'.

The output circuit 8 includes an intelligent component 12 (known as a 'smart output driver'). This intelligent component 12 has an input, hereafter referred to as first input 14, connected to the first output 10. The connection between the first output 10 and the first input 14 is, for example, of the SPI ('Stateful Packet Inspection') type. The intelligent component 12 also comprises an output, here referred to as second input 16, which is connected to the actuator 4.

In FIG. 1, it should be noted that the connection between the intelligent component 12, and more particularly the second output 16, and the actuator 4 has checking means hereafter referred to as output stage 18. The latter is a controlled output stage which is used to activate or deactivate checking between the intelligent component 12 and the actuator 4. This output stage 18 is in particular controlled by the intelligent component 12 which activates said output stage 18 when a control signal is sent to the actuator 4. The activation means of the intelligent component 12 on the output stage 18 are the usual means in a 'driver' and are therefore not shown in FIG. 1.

The present invention proposes associating a monitoring device 20 with the output circuit 8. This monitoring device 20 is of the type of electronic device known as a watchdog.

The monitoring device 20 comprises two inputs, hereafter referred to as second input 22 and third input 24, as well as an output referred to as third output 26.

The second input 22 of the monitoring device 20 is connected so as to receive any signal emitted by the intelligent component 12 and being output via the second output 16 thereof.

The third input 24 of the monitoring device 20 is connected in such a way that it receives any signal from the microcontroller 6 via the first output 10.

Before explaining the specific operation of the digital control device 2 according to the present invention, the operation is described of the monitoring of the control device. This operation is given as an example and corresponds to an operation generally observed in the field of engine management for a motor vehicle. For safety reasons, it should be ensured that when an instruction is given a valid command is actually sent to a component, e.g. an actuator. Thus, for ensuring the correct operation of the device, electronic monitoring means are used to detect at an output whether this output is in open circuit, whether it is short-circuited to the + (power supply source voltage), short-circuited to the − (to the ground) or whether the circuit is normally connected. There are thus four distinct states corresponding to an output. Test signals are emitted at regular time intervals. A response signal is sent in return to these signals. The response signal in particular contains information concerning the state of the output. Test signals are retrieved at the output of the microcontroller 6, and in particular at the first output 10. According to the function checked, the time interval between two test signals varies in length. It is generally of the order of 1 to 100 ms (magnitudes given by way of illustration and in no way restrictive).

Following this description, the operation of the digital control device 2, and more particularly of the monitoring device 20 thereof, can now be described. As stated above, FIG. 1 shows a single actuator 4 corresponding to a function managed by the digital control device 2. However, this digital control device 2 can be used to manage a large number of functions and thereby actuators or other components.

When the output of the intelligent component 12, i.e. the second output 16, is driven, a control signal is sent to the actuator 4, also activating the output stage 18. The signal then emitted by the second output 16 arrives at the input (second input 22) of the monitoring device 20. The latter, which was, for example, on standby, is activated. This monitoring device 20 is associated with a clock, e.g. an internal clock of an electronic component of the digital control device 2. The monitoring device 20, thanks to its association with a clock (not shown) initiates a time delay. This may be of the order of a few milliseconds up to approximately one second (1 s). The monitoring device 20 then has the function of cutting the connection between the intelligent component 12 and the actuator 4 at the output stage 18, if, after detecting a control signal at its second input 22, it does not receive a test signal at its other input, i.e. the third input 24. For controlling the output stage 18 and cutting the connection between the intelligent component 12 and the actuator 4, a signal is emitted by the monitoring device 20 via the third output 26 to be injected into the intelligent component 12 via a fourth input 27.

Thus, once the time delay is initiated, if no test signal is received, the output stage 18 is deactivated. Indeed, according to the management protocols, each command sent by a control component is followed by a test procedure for ensuring, on the one hand, that the instruction has been successfully received and, on the other hand, that there is no electrical fault.

When a test signal is detected by the monitoring device 20 at the third input 24, the time delay is reset for a new period of waiting for the next test signal. When no further test signal is received, this means that the command is no longer active and the monitoring device can then deactivate the output stage 18 and cut the connection between the intelligent component 12 and the actuator 4.

FIG. 3 illustrates the monitoring method that has just been described. The method according to the invention is initialized at the start-up of the system incorporating the corresponding monitoring device. This initialization step is illustrated by a first box 28. The monitoring device then monitors the emission of a control signal at the output (second output 16) of the intelligent component 12 and the emission of a test signal by the microcontroller 6 (step a).

When an output signal from the second output 16 is detected at the second input 22, a time delay is initiated within the monitoring device 20 (step b). It will be assumed here for purely illustrative purposes that the time delay is 20 ms.

Step c) verifies whether the arrival of a test signal has taken place. If yes (Y) there is a return to step b). If no (N), the output stage 18 is deactivated and there is a return to step a). In other words, if in the 20 ms following the arrival at the second input 22 of the monitoring device 20 a test signal arrives at the third input 24 of the monitoring device 20, the time delay is restarted. Thus, for example, for illustrative purposes it can be assumed that a test signal arrives at the third input 24 five ms after the arrival at the second input 22 of the output signal. A new period of 20 ms then begins during which the monitoring device 20 waits to receive a new test signal via the third input 24 thereof. If a new test signal arrives less than 20 ms after the reception of a previous test signal, the time delay is restarted. When there are no further test signals, the time delay stops and the monitoring device 20 then deactivates the output stage 18. It is assumed here that there is no new control signal emitted at the second output 16 of the intelligent component. The person skilled in the art will have understood that if such a signal should appear less than 20 ms after the last test signal received at the third input 24, the monitoring device 20 is then reactivated as described above.

The monitoring method described above does not modify the processing of test signals by the microcontroller 6. The intelligent component 12 continues to transmit, in response to the test signals emitted by the microcontroller 6, a signal informing the microcontroller 6 regarding the state of the output to be checked. If any anomalies are found, an alarm is optionally triggered according to the procedure defined for the anomaly found.

In the method described above, it is also possible to analyze the nature of the test signal at the monitoring device 20. The monitoring device 20 can thus monitor not only the presence of a test signal but also whether the test signal corresponds correctly to an expected test signal, i.e. a test signal corresponding to a diagnosis request intended for the actuator 4. In the event that the test signal is not correct, it is considered in the method that the test signal has not been received. Such an analysis may also be performed for the signal received by the second input 22.

The use of an output circuit 8 according to the present invention and/or the implementation of a monitoring method according to the present invention can be used to simplify the management of the diagnostic procedure in the digital control device. Indeed, an On-Board Diagnostic (OBD) device provides for counting the tests performed for comparing the number obtained with the number of tests that theoretically could have been carried out. This ensures that a sufficient number of tests is performed and that the diagnosis thereby obtained is regularly carried out in the time. With the present invention, therefore, it becomes unnecessary to perform statistics on the tests carried out. Any operation of the RBM (Rate Based Monitoring) type in the on-board diagnostic device may be deleted. Indeed, by adapting the time delay (duration of the time interval) in the monitoring device it is possible to ensure that a sufficient number of tests is performed. If the number of tests is insufficient, the corresponding component (actuator 4) is deactivated. Thus, the performance of tests, moreover at a sufficiently high frequency, becomes mandatory for enabling a component (actuator 4 or similar) to operate.

It will appear to the person skilled in the art that the present invention also enables the case to be detected where a component is driven 'by mistake' i.e. the case where a control instruction is issued to said component without it being requested. Indeed, if a component (actuator 4) receives a control signal which does not originate from a command of the corresponding microcontroller, this command will be quickly canceled by deactivation of the corresponding output stage 18 thanks to the implementation of the invention. The present invention thus increases the overall reliability of the system.

In the embodiment illustrated in FIG. 1, it is assumed that the monitoring device 20 is integrated into the output circuit 8. However, it is conceivable to have a monitoring device physically separate from the output circuit. This is illustrated schematically in FIG. 2. This figure shows the same references as those used for FIG. 1. The operation of the device in this FIG. 2 is similar to that described above in reference to FIG. 1 and is therefore not explained again here. The differences with FIG. 1 are that the monitoring device 20 and the output stage are external to the output circuit 8 ('driver'). Accordingly, the structure of the output stage is a little different. This output stage then takes the form of switching means, represented in FIG. 2 in the form of a switch 18' which is controlled directly by the monitoring device 20. The third output 26 of the monitoring device 20 is thus directly connected to the switch 18' (and not to a fourth input of the intelligent component 12 used for acting on the output stage). However, this monitoring device 20 has the same functions and, apart from the differences mentioned, the same connections as in the case of the first embodiment in FIG. 1.

For both embodiments of the invention the on-board diagnostic system is simplified (no RBM type management) and the reliability of the system is increased.

The invention claimed is:

1. An engine control device (2) of a motor vehicle, the engine control device (2) comprising:
   a control device (6) with means for generating a control signal and a test signal, the control signal and the test signal being provided at a first output (10) of the control device (6);
   at least one output circuit (8) comprising:
   i) an input (14) connected to the first output (10) of the control device (6), the input (14) of the at least one output circuit (8) receiving the control signal generated by the control device (6) from the first output (10) of the control device (6), and
   ii) an output (16) connected to a component (4) and equipped with switching means (18); and
   a monitoring device (20) comprising:
   i) a first input (24) connected to the first input (14) of the at least one output circuit (8) so that both the input (14)

of the at least one output circuit (8) and the first input (24) of the monitoring device (20) directly receive from the first output (10) of the control device (6), as a same direct input signal, the control signal when generated by the control device (6) and the test signal when generated by the control device (6), ii) a second input (22) connected to the output (16) of the output circuit (8), the second input (22) receiving the output (16) of the at least one output circuit (8) for monitoring the output signal at the output (16) of the at least one output circuit (8), and iii) a connection control means associated with time delay means for interrupting a connection between the output (16) of the at least one output circuit (8) and the component (4), wherein a time delay is started upon detection of the output signal from the output (16) of the at least one output circuit (8) to the first input (24) of the monitoring device (20), said time delay defining a time interval of predetermined length, and wherein when during said time interval no test signal is received, the connection control means actuates the switching means (18) to open the connection between the output (16) of the at least one output circuit (8) and the component (4).

2. The control device as claimed in claim 1, wherein the monitoring device (20) is physically integrated into the output circuit (8).

3. The control device as claimed in claim 1, wherein the monitoring device (20) is a separate circuit from the output circuit (8).

4. The control device as claimed in claim 1, wherein the monitoring device (20) comprises analysis means in order to determine whether the signal received at the first input (24) thereof corresponds to a predetermined type of signal.

5. The control device as claimed in claim 1, further comprising analysis means in order to determine whether the signal received at the second input (22) thereof corresponds to a predetermined type of signal.

6. A method of monitoring an output circuit (8), said output circuit (8) comprising:
an input (14) that receives signals, each signal being a control signal generated by a control device (6) or a test signal, and
an output (16) connected to a component (4) and equipped with switching means (18),
the method comprising using a monitoring device (20) comprising i) a first input (24) connected to the input (14) of said output circuit (8) so that both the input (14) of said output circuit (8) and the first input (24) of the monitoring device (20) directly receive from the control device (6), as a same direct input signal, the control signal when generated by the control device (6) and the test signal, ii) a second input (22) connected to the output (16) of said output circuit (8), and iii) a connection control means associated with time delay means for interrupting a connection between the output (16) of said output circuit (8) and the component (4),
the method further comprising the following steps:
a) monitoring the output signal at the output (16) of the output circuit (8) as well as the test signal received at said input (14) of said output circuit (8),
b) initiation of a time delay on detection of the output signal at the output (16) of the output circuit (8) to the first input (24) of the monitoring device (20), said time delay defining a time interval of predetermined length, and
c) when during said time interval with no test signal being received, the connection control means initiating action on the switching means (18) to open the connection between the output circuit (8) and the component (4), and return to step a), and
d) when during said time interval a test signal is received, return to step b).

7. The method of monitoring as claimed in claim 6, wherein each signal received at the input of the monitoring device is analyzed, and upon the analysis determining that the received signal does not correspond to a predetermined type of signal, the received signal is regarded as not being received.

8. The control device as claimed in claim 2, wherein the monitoring device (20) comprises analysis means in order to determine whether the signal received at the first input (24) thereof corresponds to a predetermined type of signal.

9. The control device as claimed in claim 3, wherein the monitoring device (20) comprises analysis means in order to determine whether the signal received at the first input (24) thereof corresponds to a predetermined type of signal.

10. The control device as claimed in claim 2, further comprising analysis means in order to determine whether the signal received at the second input (22) thereof corresponds to a predetermined type of signal.

11. The control device as claimed in claim 3, further comprising analysis means in order to determine whether the signal received at the second input (22) thereof corresponds to a predetermined type of signal.

12. The control device as claimed in claim 4, further comprising analysis means in order to determine whether the signal received at the second input (22) thereof corresponds to a predetermined type of signal.

* * * * *